US010100495B2

(12) United States Patent
Takahashi et al.

(10) Patent No.: US 10,100,495 B2
(45) Date of Patent: Oct. 16, 2018

(54) HYDRAULIC DRIVING SYSTEM FOR CONSTRUCTION MACHINE

(71) Applicant: Hitachi Construction Machinery Tierra Co., Ltd., Koka-shi, Shiga (JP)

(72) Inventors: Kiwamu Takahashi, Moriyama (JP); Kazushige Mori, Moriyama (JP); Masamichi Ito, Koka (JP); Yoshifumi Takebayashi, Koka (JP); Natsuki Nakamura, Koka (JP); Yasuharu Okazaki, Namerikawa (JP); Kenji Yamada, Toyama (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 225 days.

(21) Appl. No.: 15/122,789

(22) PCT Filed: Jun. 10, 2015

(86) PCT No.: PCT/JP2015/066779
§ 371 (c)(1),
(2) Date: Aug. 31, 2016

(87) PCT Pub. No.: WO2015/198868
PCT Pub. Date: Dec. 30, 2015

(65) Prior Publication Data

US 2017/0067226 A1 Mar. 9, 2017

(30) Foreign Application Priority Data

Jun. 23, 2014 (JP) ................................. 2014-128018

(51) Int. Cl.
*F16D 31/02* (2006.01)
*E02F 9/20* (2006.01)
(Continued)

(52) U.S. Cl.
CPC .......... *E02F 9/2062* (2013.01); *E02F 9/2228* (2013.01); *E02F 9/2235* (2013.01);
(Continued)

(58) Field of Classification Search
CPC ..... F15B 11/162; F15B 11/163; F15B 11/165; E02F 9/2225
(Continued)

(56) References Cited

U.S. PATENT DOCUMENTS 5,056,312 A * 10/1991 Hirata .................. F15B 11/163 60/426
5,152,143 A * 10/1992 Kajita .................. E02F 9/2296 60/422
(Continued)

FOREIGN PATENT DOCUMENTS

JP 2600928 Y2 11/1999
JP 2003-113802 A 4/2003
(Continued)

OTHER PUBLICATIONS

International Preliminary Report on Patentability (PCT/IB/338 & PCT/IB/373) issued in PCT Application No. PCT/JP2015/066779 dated Jan. 5, 2017 including English translation of document C2 (Japanese-language Written Opinion (PCT/ISA/237)) previously filed on Aug. 31, 2016 (six pages).
(Continued)

*Primary Examiner* — Michael Leslie
(74) *Attorney, Agent, or Firm* — Crowell & Moring LLP

(57) ABSTRACT

In a hydraulic driving system for construction machines, when track motors **3*f* and 3*g* are operated and the delivery pressure of a main pump 2 increases to a second value PS2 of the set pressure of a main relief valve 14, the set pressure of a signal pressure relief valve 16 increases from a third value PA1 to a fourth value PA2**, which is smaller than the
(Continued)

second value PS2 of the set pressure of the main relief valve 14, the difference between the second value PS2 and the fourth value PA2 being smaller than the target LS differential pressure. With such a structure, even if one of actuators reaches the stroke end and the delivery pressure of the hydraulic pump rises to the set pressure of the main relief valve, the other actuators do not stop, and further when the main relief valve is configured to increase the set pressure during operation of a specific actuator, the load pressure of the specific actuator does not increase to the increased set pressure of the main relief valve.

5 Claims, 6 Drawing Sheets

(51) Int. Cl.

| | |
|---|---|
| ***F15B 11/16*** | (2006.01) |
| ***E02F 9/22*** | (2006.01) |
| ***F15B 13/02*** | (2006.01) |
| ***F15B 13/06*** | (2006.01) |
| *E02F 3/32* | (2006.01) |
| *E02F 3/96* | (2006.01) |

(52) U.S. Cl.
CPC .......... *E02F 9/2285* (2013.01); *E02F 9/2296* (2013.01); *F15B 11/162* (2013.01); *F15B 11/163* (2013.01); *F15B 11/165* (2013.01); *F15B 13/024* (2013.01); *F15B 13/06* (2013.01); *E02F 3/325* (2013.01); *E02F 3/964* (2013.01); *F15B 2211/20507* (2013.01); *F15B 2211/20546* (2013.01); *F15B 2211/20553* (2013.01); *F15B 2211/30535* (2013.01); *F15B 2211/40576* (2013.01); *F15B 2211/50518* (2013.01); *F15B 2211/513* (2013.01); *F15B 2211/5151* (2013.01); *F15B 2211/55* (2013.01); *F15B 2211/6051* (2013.01); *F15B 2211/6055* (2013.01); *F15B 2211/7135* (2013.01)

(58) Field of Classification Search
USPC .......................................................... 60/422
See application file for complete search history.

(56) References Cited

U.S. PATENT DOCUMENTS

| | | | | |
|---|---|---|---|---|
| 6,584,770 | B2 * | 7/2003 | Tsuruga ................ | F15B 11/163 60/422 |
| 9,828,746 | B2 * | 11/2017 | Takebayashi ......... | F15B 11/163 |
| 9,835,180 | B2 * | 12/2017 | Takahashi ............. | F15B 11/163 |
| 2002/0157389 | A1 | 10/2002 | Tsuruga et al. | |
| 2015/0240455 | A1 | 8/2015 | Takebayashi et al. | |

FOREIGN PATENT DOCUMENTS

| | | | |
|---|---|---|---|
| JP | 2004-308899 | A | 11/2004 |
| JP | 3854027 | B2 | 12/2006 |
| JP | 2008-224039 | A | 9/2008 |
| WO | WO 2014/061507 | A1 | 4/2014 |

OTHER PUBLICATIONS

International Search Report (PCT/ISA/210) issued in PCT Application No. PCT/JP2015/066779 dated Sep. 1, 2015 with English translation (six pages).

Japanese-language Written Opinion (PCT/ISA/237) ) issued in PCT Application No. PCT/JP2015/066779 dated Sep. 1, 2015 (three pages).

* cited by examiner

Comparative Example (a) When Non-Track Actuator Load Pressure Has Reached Relief Pressure (b) When Track Motor Load Pressure Has Increased to Reach Relief Pressure Comparative Example (a) When Non-Track Actuator Load Pressure Has Reached Relief Pressure (b) When Track Motor Load Pressure Has Reached Relief Pressure Present Invention

HYDRAULIC DRIVING SYSTEM FOR CONSTRUCTION MACHINE

TECHNICAL FIELD

The present invention relates generally to hydraulic driving systems for construction machines, such as hydraulic excavators, that include a hydraulic pump of variable displacement type. More particularly, the invention is directed to hydraulic driving systems for construction machines, that performs load-sensing control to control the capacity of a hydraulic pump such that a differential pressure between a delivery pressure of the hydraulic pump and the highest load pressure of a plurality of actuators is maintained at a target differential pressure.

BACKGROUND ART

A hydraulic driving system that performs load-sensing control to control a capacity of a hydraulic pump such that a differential pressure between a delivery pressure of the hydraulic pump and the highest load pressure of a plurality of actuators is maintained at a target differential pressure has traditionally been used in construction machines such as hydraulic excavators. Patent Document 1 describes an example of such a hydraulic driving system.

The hydraulic driving system described in Patent Document 1 includes a differential pressure reducing valve configured to output, as an absolute pressure, the differential pressure between the delivery pressure of the hydraulic pump and the highest load pressure of the plurality of actuators, and the absolute pressure is introduced as a feedback load-sensing (LS) differential pressure into an LS control valve of a pump regulator, and further an absolute pressure varied according to revolution speed of an engine is introduced into the LS control valve as a target LS differential pressure to perform load-sensing control. In addition, the absolute pressure output from the differential pressure reducing valve (the differential pressure between the delivery pressure of the hydraulic pump and the highest load pressure) is introduced into a plurality of pressure compensating valves as a target compensation differential pressure to control the differential pressures across flow control valves.

By introducing the differential pressure between the delivery pressure of the hydraulic pump and the highest load pressure into the plurality of pressure compensating valves as the target compensation differential pressure and controlling the differential pressures across the flow control valves in this way, when two or more actuators are simultaneously operated, if there occurs saturation in which a flow rate of the hydraulic fluid delivered from the hydraulic pump is less than those demanded by the flow control valves, the differential pressure between the delivery pressure of the hydraulic pump and the highest load pressure decreases in accordance with the degree of saturation, which in turn reduces the target compensation differential pressure across the particular pressure compensating valve and hence the differential pressure across the particular flow control valve. The flow rate of the hydraulic fluid delivered from the hydraulic pump, therefore, can be redistributed according to a ratio of the flow rates demanded by the flow control valves, and as a result, appropriate operability can be obtained during such combined operation.

Further, by performing load-sensing control such that the absolute pressure, which is variable in accordance with the revolution speed of the engine, is used as the target LS differential pressure and introduced into the LS control valve, when the revolution speed of the engine is reduced from its rating, the target LS differential pressure correspondingly decreases. Thus, the flow rate of the hydraulic fluid supplied from the hydraulic pump to the actuators also decreases, which enables fine operability to improve.

In the hydraulic driving system that introduces the differential pressure between the delivery pressure of the hydraulic pump and the highest load pressure into the pressure compensating valves as the target compensation differential pressure, when two or more actuators are operated at the same time, in cases where one of the actuators is of a cylinder type and this actuator reaches a stroke end, the differential pressure between the delivery pressure of the hydraulic pump and the highest load pressure becomes zero (0) and hence the target compensation differential pressure also becomes 0, which fully closes the pressure compensating valves and stop the other actuator(s).

The hydraulic driving system described in Patent Document 1 employs a measure for preventing such a stoppage of an actuator. More specifically, the system further includes, in a highest load pressure line, a signal pressure variable relief valve that renders a set pressure of the valve changeable according to the particular target compensation differential pressure. When a specific actuator reaches a stroke end and the delivery pressure of the hydraulic pump increases to a set pressure of a main relief valve, the system activates the signal pressure variable relief valve to limit the maximum pressure of the highest load pressure to a pressure lower than the set pressure of the main relief valve. Accordingly, even after the specific actuator has reached its stroke end, the differential pressure between the delivery pressure of the hydraulic pump and the highest load pressure does not become 0, which prevents the pressure compensating valves from fully closing, prevent the other actuator(s) from stopping, and maintain the appropriate operability during combined operation.

On the other hand, so-called boost circuits are known. These circuits are designed such that only when a specific actuator is operated, the circuit increases the set pressure of the main relief valve by a predetermined value from a first value to a second value and increases the maximum delivery pressure of the hydraulic pump. Patent Document 2 describes an example of such boost circuits.

The traveling excavation machine, such as a hydraulic excavator, that is described in Patent Document 2 includes a main relief valve configured as a variable relief valve so as to increase a pressure setting of the main relief valve from a first value to a second value only when an operating pilot pressure for a track operating device is introduced into the main relief valve and a control lever of the track operating device is operated. This configuration of the machine ensures generation of the output torque required of track motors during track operation, and improves traveling performance of the machine.

PRIOR ART DOCUMENTS

Patent Documents

Patent Document 1: Japanese Patent No. 3854027

Patent Document 2: Japanese Utility Model Application No. 2600928

SUMMARY OF THE INVENTION

Problems to be Solved by the Invention

In the load-sensing control hydraulic driving system in Patent Document 1 that includes the signal pressure variable relief valve in the highest load pressure line, however, the following problems were found to exist if the main relief valve is configured to work as the variable relief valve so as to increase the set pressure of the main relief valve from the first value to the second value during track operation, as in Patent Document 2.

That is to say, if during the track operation any impacts such as presence of an obstacle or inclination of a slope climbing travel surface cause a track motor to stop rotating, originally the delivery pressure of the hydraulic pump is supposed to increase to the second value of the set pressure of the main relief valve. However, since the maximum pressure of the highest load pressure is limited by the signal pressure variable relief valve to a pressure smaller than the first value of the set pressure of the main relief valve, load-sensing control enables the delivery pressure of the hydraulic pump to increase to a pressure obtained by adding a load-sensing control target differential pressure to the highest load pressure that has been limited to the pressure smaller than the first value of the set pressure of the main relief valve by the signal pressure variable relief valve. Consequently the load pressure upon the track motor fails to increase to the second value of the set pressure of the main relief valve, for which reason, the generation of the track motor output torque due to the increase in the set pressure of the main relief valve becomes ineffective.

An object of the present invention is to provide a hydraulic driving system for a construction machine, that controls a capacity of a hydraulic pump by load-sensing control such that a differential pressure between a delivery pressure of the hydraulic pump and the highest load pressure of a plurality of actuators is maintained at a target differential pressure, in which during a combined operation for simultaneously driving a plurality of actuators, even when one of the actuators has reached its stroke end and the delivery pressure of the hydraulic pump has increased to a set pressure of a main relief valve, the other actuators remain active, and further, when the set pressure of the main relief valve is made variable and the set pressure of the main relief valve increases during operation of a specific actuator, the load pressure of the specific actuator can reliably rises to the increased set pressure of the main relief valve.

Means for Solving the Problems

To achieve the above object, the present invention provides a hydraulic driving system for a construction machine comprising: a hydraulic pump of variable displacement type driven by a prime mover; a plurality of actuators each driven by a hydraulic fluid delivered from the hydraulic pump; a plurality of flow control valves that each control a flow rate of the hydraulic fluid supplied from the hydraulic pump to a corresponding one of the plurality of actuators; a plurality of pressure compensating valves each for controlling a differential pressure across a corresponding one of the flow control valves independently such that the differential pressure across the corresponding flow control valve equals a target compensation differential pressure; a pump control device for controlling a capacity of the hydraulic pump by load-sensing control such that a delivery pressure of the hydraulic pump becomes higher by a target differential pressure than a highest load pressure of the plurality of actuators; a main relief valve that limits a maximum pressure of the delivery pressure of the hydraulic pump; a highest load pressure detection circuit that detects a highest load pressure of the actuators and outputs the detected highest load pressure to a highest load pressure line; and a signal pressure relief valve connected to the highest load pressure line via a restrictor and configured to limit the maximum pressure of the highest load pressure introduced to a downstream side of the restrictor, to a pressure lower than a set pressure of the main relief valve; wherein, the pump control device receives a differential pressure between the delivery pressure of the hydraulic pump and the highest load pressure in the downstream side of the restrictor and the pump control device controls the capacity of the hydraulic pump such that the differential pressure equals the target differential pressure for the load-sensing control, while the differential pressure between the delivery pressure of the hydraulic pump and the highest load pressure in the downstream side of the restrictor is introduced into the plurality of pressure compensating valves as the target compensation differential pressure; and wherein: the main relief valve is configured such that when a specific actuator of the plurality of actuators is not actuated, the set pressure of the main relief valve is remained at a first value, and when the specific actuator is actuated, the set pressure of the main relief valve increases from the first value to a second value larger than the first value; and the signal pressure relief valve is configured such that when the specific actuator is not actuated and the set pressure of the main relief valve is remained at the first value, the set pressure of the signal pressure relief valve is remained at a third value smaller than the first value of the set pressure of the main relief valve, when the specific actuator is actuated and the set pressure of the main relief valve increases to the second value, the set pressure of the signal pressure relief valve increases from the third value to a fourth value smaller than the second value of the set pressure of the main relief valve, the first to forth values being set such that a difference between the first value of the set pressure of the main relief valve and the third value of the set pressure of the signal pressure relief valve and a difference between the second value of the set pressure of the main relief valve and the fourth value of the set pressure of the signal pressure relief valve are both smaller than the target differential pressure for the load-sensing control.

By providing the main relief valve and the signal pressure relief valve in this way, since during operation of actuators other than the specific actuator the set pressure of the signal pressure relief valve is the third value smaller than the first value of the set pressure of the main relief valve, when the non-specific actuator has reached a stroke end and the delivery pressure of the hydraulic pump has increased to the first value of the set pressure of the main relief valve, the highest load pressure is limited to a pressure smaller than the first value of the set pressure of the main relief valve, and the differential pressure between the delivery pressure of the hydraulic pump and the highest load pressure does not become 0, and hence the pressure compensating valves do not fully close. Therefore, the non-specific actuator (one of the other actuators) remains active and maneuverability is maintained during combined operation.

In addition, since during the operation of the specific actuator, the set pressure of the main relief valve increases from the first value to the second value, the set pressure of the signal pressure relief valve increases from the third value to the fourth value smaller than the second value of the set pressure of the main relief valve, and a value of the difference between the second value of the set pressure of the main relief valve and the fourth value of the set pressure of the signal pressure relief valve is smaller than the target differential pressure for the load-sensing control, the load-sensing control works to increase the delivery pressure of the hydraulic pump to the second value of the set pressure of the main relief valve, thus reliably increasing the load pressure of the specific actuator to the second value of the increased set pressure of the main relief valve, and hence providing necessary driving force.

Furthermore, since when the combined operation for driving the other actuators is conducted in that state and the other actuators reach respective stroke ends and the delivery pressure of the hydraulic pump increases to the second value of the set pressure of the main relief valve, the highest load pressure is limited to the fourth pressure smaller than the second value of the set pressure of the main relief valve, and therefore as in the case where the non-specific actuator described above is operated, the differential pressure between the delivery pressure of the hydraulic pump and the highest load pressure does not become 0 and the pressure compensating valves do not fully close. Therefore, in this case as well, the non-specific actuator (one of the other actuators) remains active and maneuverability is maintained during the combined operation.

Advantages of the Invention

In accordance with the present invention, in the hydraulic driving system for construction machines, that controls a capacity of the hydraulic pump by load-sensing control such that a differential pressure between the delivery pressure of the hydraulic pump and the highest load pressure of the plurality of actuators is maintained at the target differential pressure, during the combined operation for simultaneously driving the plurality of actuators, even when one of the actuators has reached the stroke end and the delivery pressure of the hydraulic pump has increased to the set pressure of the main relief valve, the other actuators remain active and the maneuverability can be obtained during the combined operation. In addition, when the set pressure of the main relief valve is made variable and the set pressure of the main relief valve increases during operation of a specific actuator, the load pressure of the specific actuator can reliably rises to the increased set pressure of the main relief valve, and thus the necessary driving force can be obtained.

Figure 4:
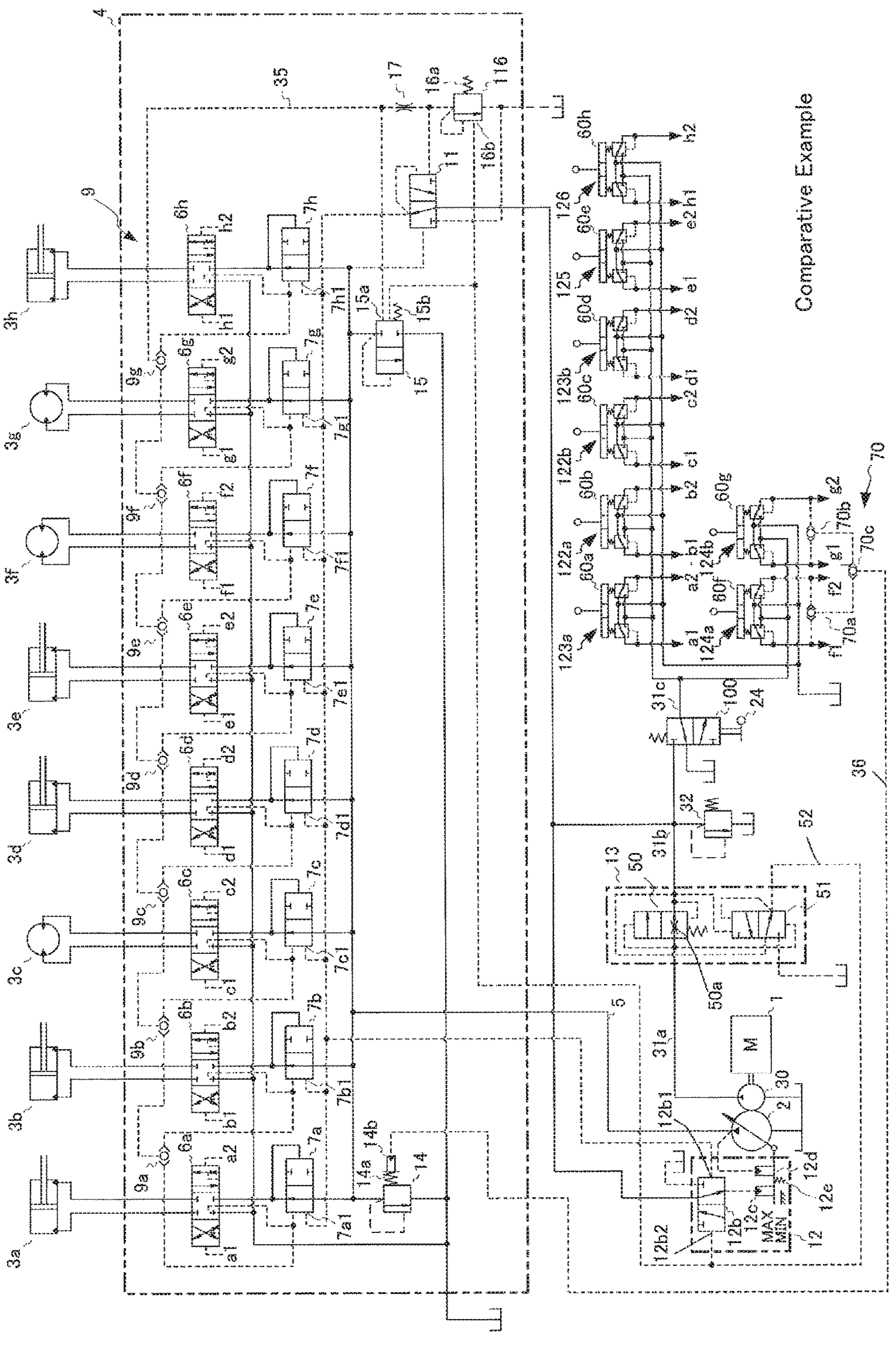
FIG. 4 is a diagram showing a comparative example.
Figure 5:
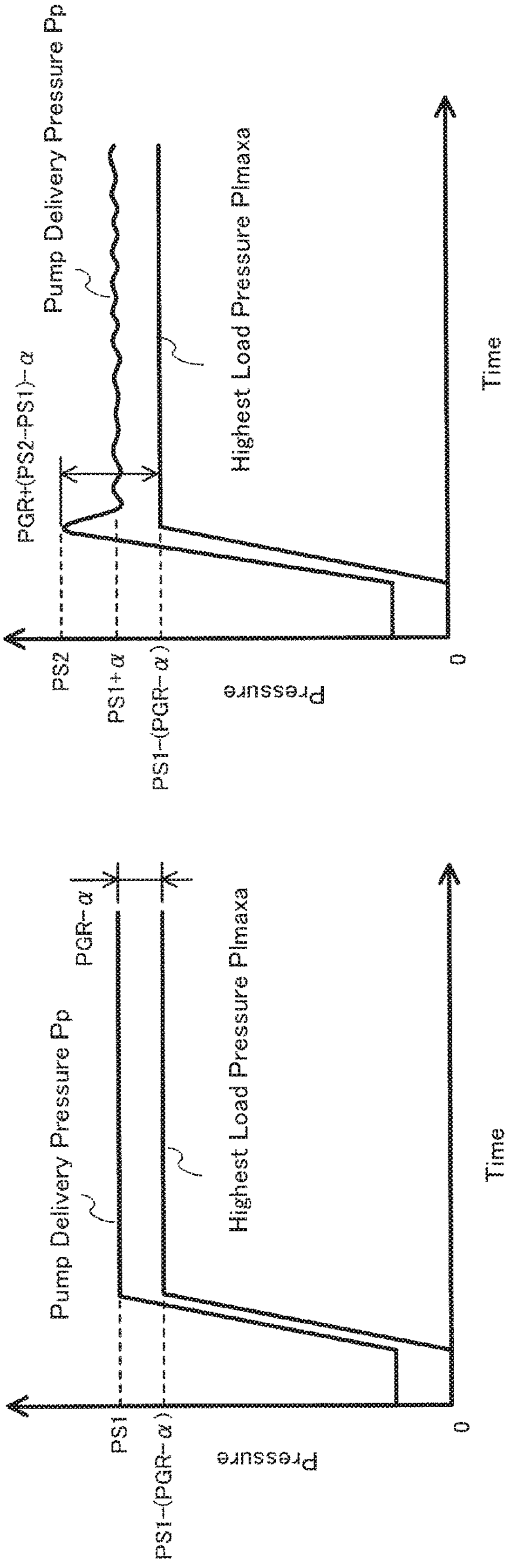

Left side (a) of FIG. 5 is a diagram relating to the comparative example shown in FIG. 4, the diagram representing a relationship between a delivery pressure obtained when a control lever of a non-track operating device is operated and the delivery pressure of a main pump reaches a set pressure of the main relief valve, and the highest load pressure in which a maximum pressure is limited by the signal pressure variable relief valve, right side (b) of FIG. 5 is a diagram relating to the comparative example shown in FIG. 4, the diagram representing a relationship between a delivery pressure obtained when a control lever of a track operating device is operated and the delivery pressure of the main pump reaches a set pressure of the main relief valve, the track operating signal pressure is equal to or higher than its threshold level, and the delivery pressure of the main pump reaches a set pressure of the main relief valve, and the highest load pressure in which the maximum pressure is limited by the signal pressure variable relief valve.

Figure 1:
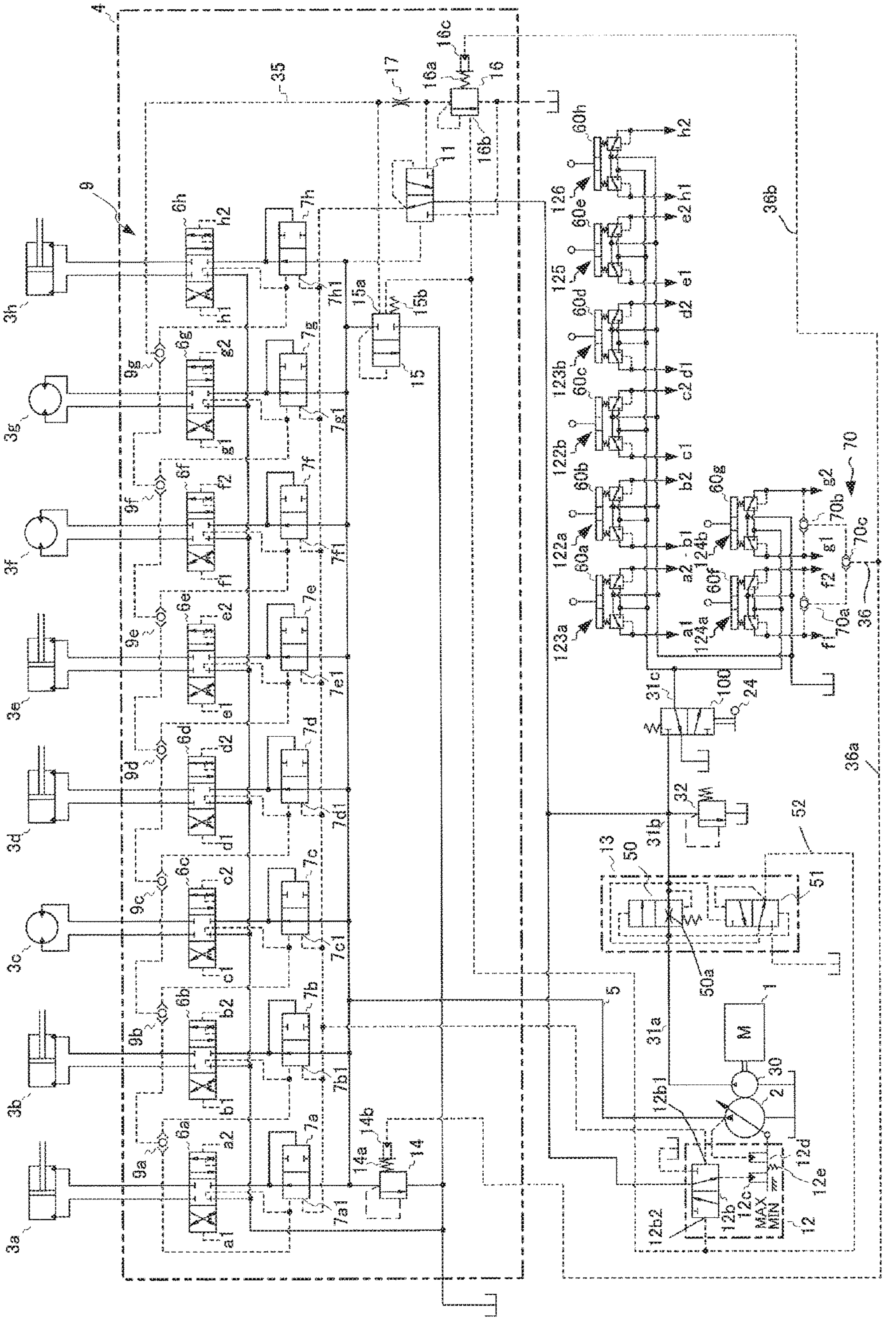
FIG. 1 is a diagram showing a hydraulic driving system of a hydraulic excavator (construction machine) according to an embodiment of the present invention.
Figure 6:
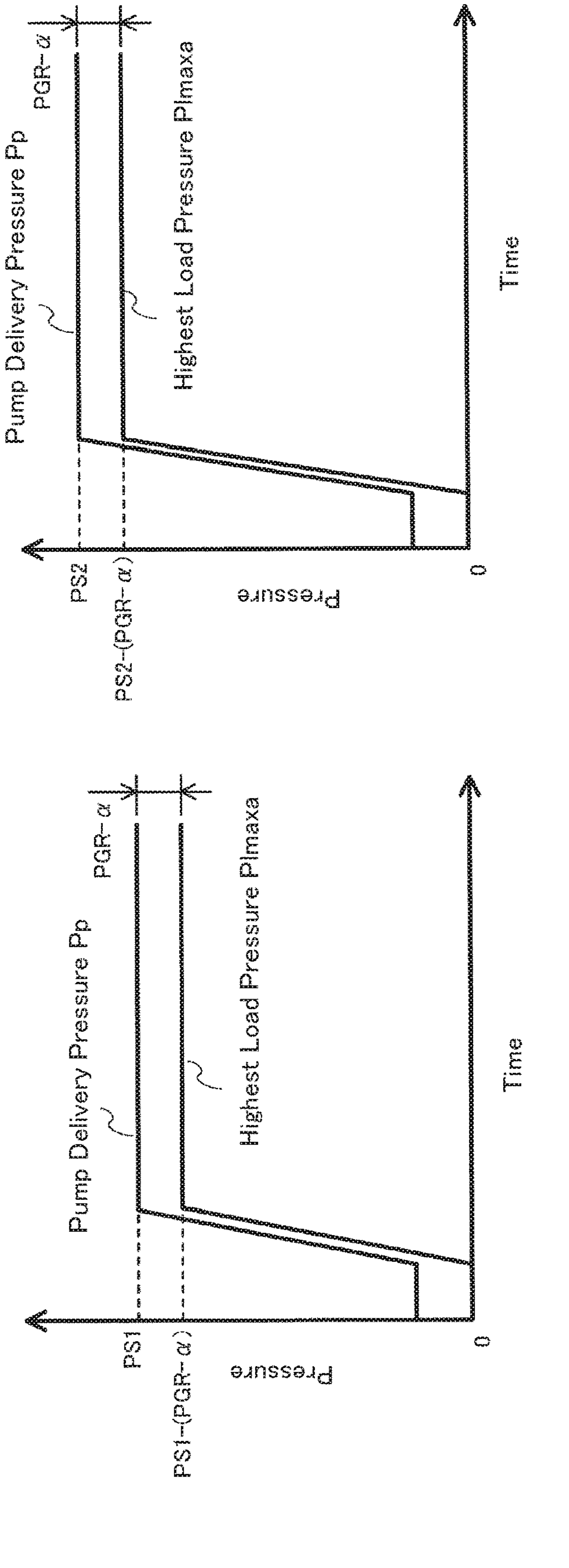

Left side (a) of FIG. 6 is a diagram relating to the embodiment shown in FIG. 1, the diagram representing a relationship between a delivery pressure obtained when a control lever of a non-track operating device is operated and the delivery pressure of a main pump reaches a set pressure of the main relief valve, and the highest load pressure in which a maximum pressure is limited by the signal pressure variable relief valve, and right side (b) of FIG. 6 is a diagram relating to the embodiment shown in FIG. 1, the diagram representing a relationship between a delivery pressure obtained when a control lever of a track operating device is operated and the delivery pressure of the main pump reaches a set pressure of the main relief valve, the track operating signal pressure is equal to or higher than its threshold level, and the delivery pressure of the main pump reaches a set pressure of the main relief valve, and the highest load pressure in which the maximum pressure is limited by the signal pressure variable relief valve.

MODE FOR CARRYING OUT THE INVENTION

Hereunder, an embodiment of the present invention will be described in accordance with the accompanying drawings.

—Structure—

FIG. 1 is a diagram showing a hydraulic driving system of a hydraulic excavator (a construction machine) according to an embodiment of the present invention.

The hydraulic excavator of the present embodiment, shown in FIG. 1, includes the following: a prime mover 1 such as a diesel engine; a main pump 2 (hydraulic pump) of variable displacement type that is driven by the prime mover 1 and delivers a hydraulic fluid to a hydraulic fluid supply line 5; a fixed displacement pilot pump 30 that is driven by the prime mover 1 and delivers the hydraulic fluid to a hydraulic fluid supply line 31*a*; a plurality of actuators, namely 3*a*, 3*b*, 3*c*, 3*d*, 3*e*, 3*f*, 3*g*, and 3*h*, each driven by the hydraulic fluid delivered from the main pump 2; a control valve unit 4 that is connected to the hydraulic fluid supply line 5 and controls a flow of the hydraulic fluid supplied from the main pump 2 to the actuators 3*a* to 3*h*; and a regulator 12 (pump control device) that controls a delivery rate of the main pump 2 by load-sensing control and torque control.

The control valve unit 4 includes: a plurality of flow control valves 6*a*, 6*b*, 6*c*, 6*d*, 6*e*, 6*f*, 6*g*, and 6*h* that are each connected to the hydraulic fluid supply line 5 and control a flow rate and a flow direction of the hydraulic fluid supplied from the main pump 2 to the actuators 3*a* to 3*h*; a plurality of pressure compensating valves 7*a*, 7*b*, 7*c*, 7*d*, 7*e*, 7*f*, 7*g*, and 7*h* that each control a differential pressure across a corresponding one of the flow control valves 6*a* to 6*h* such that the differential pressure across the corresponding one of the flow control valves 6*a* to 6*h* equals a target differential pressure level, whereby the flow rate of the fluid controlled by each of the flow control valves 6*a* to 6*h* becomes proportional to a meter-in opening area of the flow control valve; a main relief valve 14 connected to the hydraulic fluid supply line 5 and configured to limit a maximum pressure of the pressure Pp of the hydraulic fluid supply line 5 (the delivery pressure of the main pump 2); an unloading valve 15 connected to the hydraulic fluid supply line 5 and configured such that when the pressure Pp of the hydraulic fluid supply line 5 (the delivery pressure of the main pump 2) increases above a set pressure (an unloading pressure) previously set by adding an unloading differential pressure Pun0 to a highest load pressure of the actuators 3*a* to 3*h*, the unloading valve 15 opens to return the hydraulic fluid within the hydraulic fluid supply line 5 to a tank; a highest load pressure detection circuit 9, which includes shuttle valves 9*a*, 9*b*, 9*c*, 9*d*, 9*e*, 9*f*, and 9*g* connected in tournament form to load ports of the flow control valves 6*a* to 6*h* to detect the highest load pressure Plmax of the actuators 3*a* to 3*h*, and outputs the detected highest load pressure Plmax to a highest load pressure line 35 connected to an output port of the shuttle valve 9*g* provided at a final stage of the shuttle valve set; a signal pressure relief valve 16 connected to the highest load pressure line 35 via a restrictor (fixed restrictor) 17 to limit a maximum pressure of the highest load pressure Plmaxa which has been introduced into a downstream side of the restrictor 17 in the highest load pressure line 35, to a pressure lower than the set pressure of the main relief valve 14; and a differential-pressure reducing valve 11 configured to output an absolute pressure Pls as a differential pressure between the delivery pressure (pump pressure) Pp of the main pump 2 and the highest load pressure Plmaxa in the downstream side of the restrictor 17 in the highest load pressure line 35.

Figure 3:
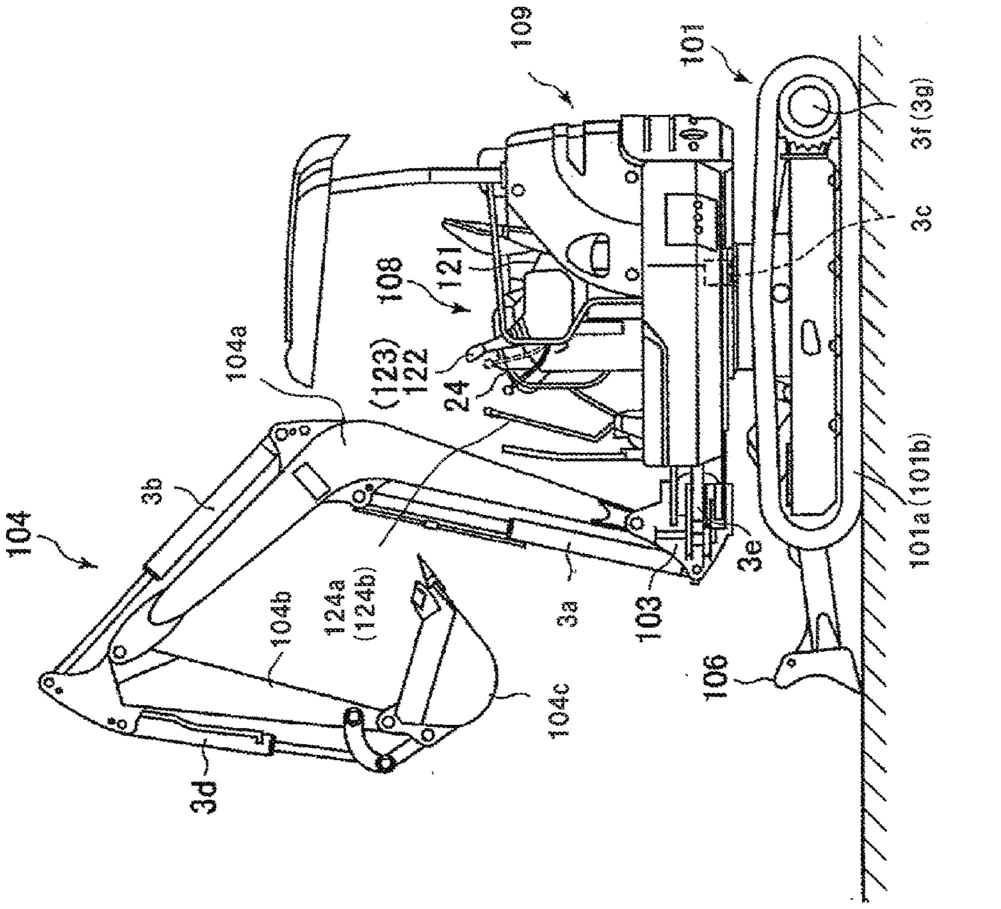
FIG. 3 is an external view of the hydraulic excavator including the hydraulic driving system of the present invention.

The actuator 3*a* is for example a boom cylinder that drives a boom 104*a* of the hydraulic excavator, shown in FIG. 3, the actuator 3*b* is for example an arm cylinder that drives an arm 104*b* of the hydraulic excavator, shown in FIG. 3, and the actuator 3*c* is for example a swing motor that drives an upper swing structure 109 of the hydraulic motor, shown in FIG. 3. The actuator 3*d* is for example a bucket cylinder that drives a bucket 104*c* shown in FIG. 3, the actuator 3*e* is for example a swing cylinder that drives a swing post 103 shown in FIG. 3, and the actuator 3*f* is for example a left track motor that drives a left crawler 101*a* of a lower track structure, shown in FIG. 3. The actuator 3*g* is for example a right track motor that drives a right crawler 101*b* of the hydraulic excavator lower track structure, shown in FIG. 3, and the actuator 3*h* is for example a blade cylinder that drives a blade 106 shown in FIG. 3.

In addition to the above constituent elements, the hydraulic driving system of the present embodiment includes: a prime mover revolution speed detection valve 13 connected to the hydraulic fluid supply line 31*a* of the pilot pump 30 and configured to detect, as an absolute pressure PGR, the flow rate of the fluid delivered from the pilot pump 30; a pilot relief valve 32 connected to a pilot hydraulic fluid supply line 31*b* in the downstream side of the prime mover revolution speed detection valve 13 and working to generate a constant pilot pressure Ppi in the pilot hydraulic fluid supply line 31*b*; a gate lock valve 100 connected to the pilot hydraulic fluid supply line 31*b* and serving to select whether a downstream hydraulic fluid supply line 31*c* is to be connected to the hydraulic fluid supply line 31*b* or the tank, depending on a state of a gate lock lever 24; a plurality of pilot valve units 60*a*, 60*b*, 60*c*, 60*d*, 60*e*, 60*f*, 60*g*, and 60*h*, each connected to the hydraulic fluid supply line 31*c* downstream of the gate lock valve 100 and including one pair of pilot valves (pressure reducing valves) to generate an operating pilot pressures a1 and a2, b1 and b2, c1 and c2, d1 and d2, e1 and e2, f1 and f2, g1 and g2, or h1 and h2, which are used to switch the flow control valves 6*a* to 6*h*, based on the constant pilot pressure Ppi; and a track operation detection circuit (specific actuator operations detection circuit) 70 including shuttle valves 70*a*, 70*b*, and 70*c* connected in tournament form to an output line of each pilot valve pair in the pilot valve units 60*f* and 60*g*.

The prime mover revolution speed detection valve 13 includes a flow rate detection valve 50 connected between the hydraulic fluid supply line 31*a* and pilot hydraulic fluid supply line 31*b* of the pilot pump 30, and a differential pressure reducing valve 51 configured to output a differential pressure across the flow rate detection valve 50 as the absolute pressure PGR.

The flow rate detection valve 50 includes a variable restrictor 50*a*, which increases an opening area of the valve 50 with increases in the flow rate of the fluid passed through the valve (i.e., the flow rate of the fluid delivered from the pilot pump 30). The oil delivered from the pilot pump 30 flows toward the pilot hydraulic fluid supply line 31*b* through the variable restrictor 50*a* of the flow rate detection valve 50. At the same time, there is a differential pressure, which becomes larger as the flow rate at the variable restrictor 50*a* increases, across the variable restrictor 50*a* of the flow rate detection valve 50. The differential pressure reducing valve 51 outputs this differential pressure to a signal pressure line 52 as the absolute pressure PGR. The flow rate of the fluid delivered from the pilot pump 30 depending on the revolution speed of the prime mover 1, detecting the differential pressure across the variable restrictor 50*a* allows the flow rate of the fluid delivered from the pilot pump 30 and also the revolution speed of the prime mover 1 to be detected.

The pilot valve units 60*a*, 60*b*, 60*c*, 60*d*, 60*e*, 60*f*, 60*g*, and 60*h* are provided in a boom operating device 123*a*, an arm operating device 122*a*, an swing operating device 122*b*, a bucket operating device 123*b*, a swing operating device 125, a left-track operating device 124*a*, a right-track operating device 124*b*, and a blade operating device 126, respectively. When control levers are operated by an operator, the pilot valve units comes into operation and generate the relevant operating pilot pressures a1 and a2, b1 and b2, c1 and c2, d1 and d2, e1 and e2, f1 and f2, g1 and g2, or h1 and h2.

The pilot valve units 60*f* and 60*g* with the shuttle valves 70*a*, 70*b*, and 70*c* connected thereto are for traveling purposes, and when the track operating device 124*a* or 124*b* is operated, the shuttle valve 70*a*, 70*b*, or 70*c* detects the corresponding pilot pressure (the highest pressure of four operating pilot pressures, f1, f2, g1, and g2) as a track operating signal pressure Ptpi and then output the detected track operating signal pressure Ptpi to a signal pressure line 36, 36*a*, or 36*b* connected to an output port of the shuttle valve 70*c* provided as a final stage.

The absolute pressure PGR that has been output from the differential pressure reducing valve 51 of the prime mover revolution speed detection valve 13 is introduced as a target LS differential pressure into the regulator 12. The absolute pressure PGR is also introduced, as part of the set pressure Pun0, in the side operative in the valve closing direction. The absolute pressure Pls that has been output from the differential pressure reducing valve 51 is introduced as a feedback LS differential pressure into the regulator 12 of the main pump 2. The absolute pressure Pls is also introduced, as the target compensation differential pressure, in the side operative in the valve opening direction. In addition, the absolute pressure PGR that was output from the differential pressure reducing valve 51 of the prime mover revolution speed detection valve 13 is introduced into the signal pressure relief valve 16 as part of a set pressure PA described later in detail. Meanwhile, the track operating signal pressure Ptpi that has been detected by the track operation detection circuit 70 is introduced into the main relief valve 14 via the signal pressure line 36*a* as part of a set pressure PS described later in detail. The track operating signal pressure Ptpi is also introduced into the signal pressure relief valve 16 via the signal pressure line 36*b* as part of the set pressure PS described later in detail.

The regulator 12 includes an LS control valve 12*b*, an LS control piston (capacity control actuator) 12*c*, a torque control (horsepower control) piston (capacity control actuator) 12*d*, and a spring 12*e*.

The LS control valve 12*b* includes a pressure receiving element 12*b*1 at an end portion of the side operative in a direction in which a constant pilot pressure Ppi is introduced into the LS control piston 12*c*. The LS control valve 12*b* also includes a pressure receiving element 12*b*2 at an end portion of the side operative in a direction in which the hydraulic fluid in the LS control piston 12*c* is released to the tank. The absolute pressure Pls (feedback LS differential pressure) that was output from the differential pressure reducing valve 11 and passed through a switching valve 80 is introduced into the pressure receiving element 12*b*1, and the absolute pressure PGR (target LS differential pressure) that has been output from the prime mover revolution speed detection valve 13 is introduced into the pressure receiving element 12*b*2. If Pls>PGR, the LS control valve 12*b* operates to introduce the constant pilot pressure Ppi into the LS control piston 12*c*, and if Pls<PGR, the LS control valve 12*b* operates to release the hydraulic fluid in the LS control piston 12*c* to the tank. The LS control piston 12*c* operates to reduce tilting (capacity) of the main pump 2 when the constant pilot pressure Ppi is introduced and the pressure in the LS control piston 12*c* increases and operates to increase the tilting (capacity) of the main pump 2 when the pressure in the LS control piston 12*c* is released to the tank and the pressure decreases. Accordingly the differential pressure Pls that was output from the differential pressure reducing valve 11 (the differential pressure (feedback LS differential pressure) between the delivery pressure Pp of the main pump 2 and the highest load pressure Plmaxa in the downstream side of the restrictor 17 in the highest load pressure line 35) is controlled to be equal to the absolute pressure PGR (target LS differential pressure) that was output from the prime mover revolution speed detection valve 13, so that the delivery pressure Pp from the main pump 2 is controlled to be higher than the highest load pressure Plmaxa of the actuators 3*a* to 3*h* by the target differential pressure PGR. In this way, the LS control valve 12*b* and the LS control piston 12*c* constitute a load-sensing control section to control the capacity of the main pump 2 such that the delivery pressure Pp of the main pump 2 is higher than the highest load pressure Plmaxa of the actuators 3*a* to 3*h* by the target differential pressure PGR.

The delivery pressure of the main pump 2 is introduced to the torque control piston 12*d*. The increase in the delivery pressure reduces the tilting (capacity) of the main pump 2 and thus controls torque that the main pump 2 absorbs does not exceed a predetermined torque value. The spring 12*e* sets a torque limit for the torque control. In this way, the torque control piston 12*d* and the spring 12*e* constitute a torque control section to control the capacity of the main pump 2 such that the torque that the main pump 2 absorbs does not exceed the torque limit when the delivery pressure of the main pump 2 increases.

The pressure compensating valves 7*a* to 7*h* include, in the respective sides operative in the valve opening direction, pressure receiving elements, namely 7*a*1, 7*b*1, 7*c*1, 7*d*1, 7*e*1, 7*f*1, 7*g*1, and 7*h*1, into which the absolute pressure Pls that was output from the differential pressure reducing valve 11 is introduced, and the absolute pressure Pls is set as the target compensation differential pressure. The pressure compensating valves 7*a* to 7*h* each control the differential pressure across a corresponding one of the flow control valves 6*a* to 6*h* such that the differential pressure equals the target compensation differential pressure. Thus during combined operation that drive a plurality of actuators at the same time, the flow rate of the fluid delivered from the main pump 2 is appropriately distributed according to the opening areas of the flow control valves, irrespective of the magnitudes of the load pressures of the actuators, and consequently, maneuverability is ensured during the combined operation. If the flow rate of the fluid delivered from the main pump 2 enters a saturation state in which the flow rate is less than that actually demanded, since the absolute pressure Pls output by the differential pressure reducing valve 11 decreases according to the shortage level of the supplied fluid, the target compensation differential pressure across the pressure compensating valve correspondingly decreases. In this case as well, the flow rate of the fluid delivered from the main pump 2 is appropriately distributed according to the opening area of that flow control valve and consequently, maneuverability is ensured during the combined operation.

The unloading valve 15 includes, in the side operative in the valve closing direction, a pressure receiving element 15*a* into which the absolute pressure PGR (target LS differential pressure) that was output from the prime mover revolution speed detection valve 13 is introduced. The unloading valve 15 further includes a spring 15*b* in the same side operative in the valve closing direction. In addition, the unloading valve 15 is configured such that the pressure Pp of the hydraulic fluid supply line 5, that is, the delivery pressure of the main pump 2, is applied to the unloading valve 15 in the side operative in the valve opening direction and the highest load pressure Plmax detected by the highest load pressure detection circuit 9 is applied to the side operative in the valve closing direction. The unloading valve 15 has its set pressure defined by three factors, namely the absolute pressure PGR (target LS differential pressure), an urging force of the spring 15*b*, and the highest load pressure Plmax. That is to say, the set pressure of the unloading valve 15 is assigned as a pressure obtained by adding the absolute pressure PGR (target LS differential pressure), a pressure conversion value of the urging force of the spring 15*b*, and the highest load pressure Plmax. When the delivery pressure Pp of the main pump 2 increases above the set pressure of the unloading valve 15, the unloading valve 15 opens to return the fluid within the hydraulic fluid supply line 5 to the tank, thus causing the delivery pressure Pp of the main pump 2 to be controlled so as not to be higher than a pressure obtained by adding the pressure conversion value of the urging force of the spring 15*b* to the target LS differential pressure PGR. The pressure conversion value of the urging force of the spring 15*b* is usually smaller than the target LS differential pressure PGR.

The main relief valve 14 includes a spring 14*a* and a pressure receiving element 14*b* (a first pressure receiving element) in the side operative in the valve closing direction. The pressure receiving element 14*b* is connected to the signal pressure line 36*a*, and the track operating signal pressure Ptpi that was detected by the track operation detection circuit 70 is applied to the pressure receiving element 14*b*. When neither the track operating device 124*a* nor 124*b* is actuated and the track operating signal pressure Ptpi is the tank pressure, the set pressure PS of the main relief valve 14 takes a first value PS1 that has been set for the spring 14*a*. When at least one of the track operating devices 124*a* and 124*b* is actuated and the track operating signal pressure Ptpi equals or exceeds a threshold level Ptr, the urging force of the spring 14*a* and the track operating signal pressure Ptpi applied to the pressure receiving element 14*b* causes the set pressure PS of the main relief valve 14 to increase from the first value PS1 to a second value PS2 larger than the first value PS1. As can be seen from this fact, the main relief valve 14 is configured as a variable relief valve that changes the set pressure PS to one of the two values, namely PS1 and PS2, depending on the track operating signal pressure Ptpi applied to the pressure receiving element 14*b*.

The signal pressure relief valve 16 includes a spring 16*a* in the side operative in the valve closing direction and a first pressure receiving element 16*b* in the side operative in the valve opening direction. The pressure receiving element 16*b* is connected to the signal pressure line 52. The signal pressure relief valve 16 is configured as a variable relief valve that changes the set pressure PA according to the output pressure (absolute pressure) PGR of the prime mover revolution speed detection valve 13 that is applied to the pressure receiving element 14*b*.

In addition, the signal pressure relief valve 16 includes a second pressure receiving element 16*c* (second pressure receiving element) in the side operative in the valve closing direction. The pressure receiving element 16*c* is connected to a signal pressure line 36*b*, and the track operating signal pressure Ptpi detected by the track operation detection circuit 70 is applied to the pressure receiving element 16*c*. When neither the track operating device 124*a* nor 124*b* is actuated and the track operating signal pressure Ptpi is the tank pressure, a set pressure PA of the signal pressure relief valve 16 is a third value PA1 based on an urging force of the spring 16*a* and an absolute pressure PGR applied to the pressure receiving element 16*b*. When at least one of the track operating devices 124*a* and 124*b* is actuated and the track operating signal pressure Ptpi equals or exceeds the threshold level Ptr, the set pressure PA of the signal pressure relief valve 16 increases from the third value PA1 to a fourth value PA2 larger than the third value PA1. As can be seen from this, the signal pressure relief valve 16 is also configured as a variable relief valve that changes the set pressure PA to one of the two values, namely PA1 and PA2, depending on the pressure applied to the pressure receiving element 16*c*. The signal pressure relief valve 16 will be referred to as the signal pressure variable relief valve.

Figure 2:
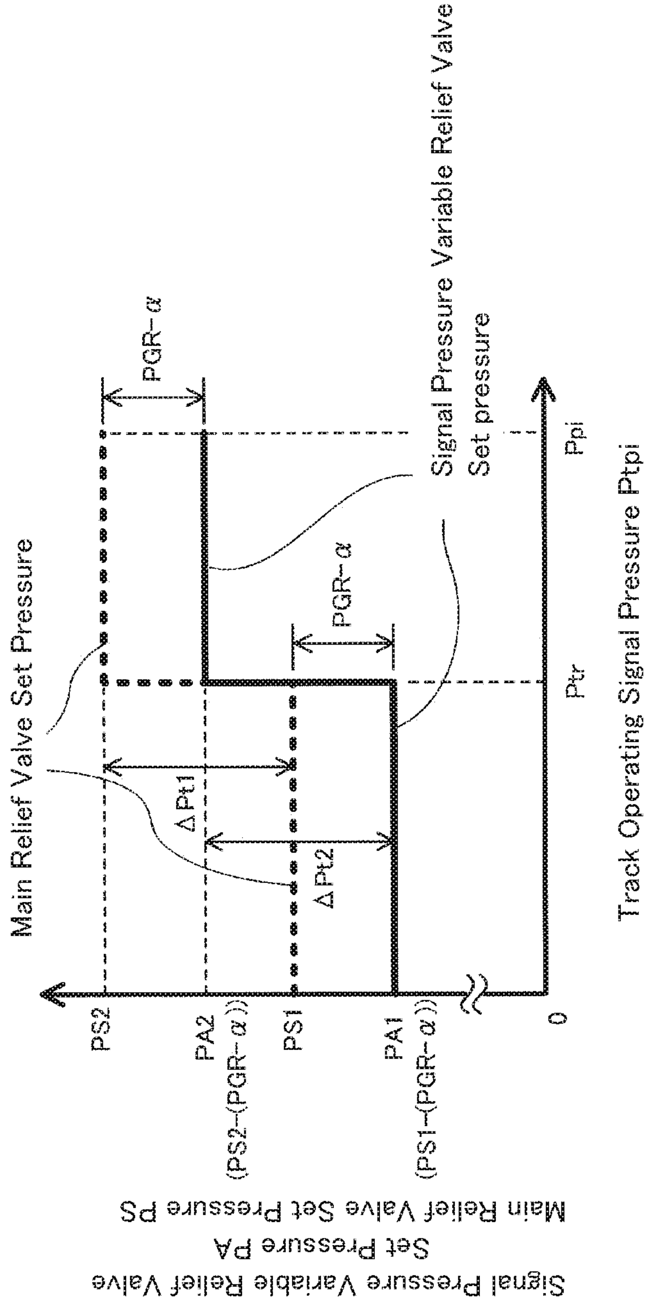
FIG. 2 is a diagram that shows changes in set pressure of a main relief valve and a signal pressure variable relief valve with respect to changes in track operating signal pressure.

FIG. 2 is a diagram that shows changes in the set pressures of the main relief valve 14 and the signal pressure variable relief valve 16 with respect to the track operating signal pressure Ptpi. A horizontal axis in the figure denotes the track operating signal pressure Ptpi detected by the track operation detection circuit 70, and a vertical axis denotes the set pressures PS and PA of the main relief valve 14 and the signal pressure variable relief valve 16.

FIG. 2 indicates that when neither the track operating device 124*a* nor 124*b* is actuated and the track operating signal pressure Ptpi is the tank pressure, the set pressure PS of the main relief valve 14 takes the first value PS1 because the urging force of the spring 14*a* is applied. FIG. 2 also indicates that when at least one of the track operating devices 124*a* and 124*b* is actuated and the track operating signal pressure Ptpi equals or exceeds the threshold level Ptr, the set pressure PS of the main relief valve 14 increases by ΔPt1 from the first value PS1 to the second value PS2 larger than the first value PS1. This increase is due to the track operating signal pressure Ptpi applied to the pressure receiving element 14*b*. The increment ΔPt1 is a pressure value set by the application of the track operating signal pressure Ptpi to the pressure receiving element 14*b* of the main relief valve 14.

When neither the track operating device 124*a* nor 124*b* is actuated and the track operating signal pressure Ptpi is the tank pressure, the set pressure PA of the signal pressure variable relief valve 16 remains the third value PA1 due to the urging force of the spring 16*a* and the absolute pressure PGR applied to the pressure receiving element 16*b*. When at least one of the track operating devices 124*a* and 124*b* is actuated and the track operating signal pressure Ptpi equals or exceeds the threshold level Ptr, the set pressure PA of the signal pressure variable relief valve 16 increases by ΔPt2 from the third value PA1 to the fourth value PA2 larger than the third value PA1 due to the track operating signal pressure Ptpi applied to the pressure receiving element 16*c*. The increment ΔPt2 is a pressure value set by the application of the track operating signal pressure Ptpi higher than the threshold level Ptr, to the pressure receiving element 16*c* of the signal pressure variable relief valve 16. In the present embodiment, ΔPt2 =ΔPt1.

Here, the spring 16*a* is configured to have a spring constant equivalent to a pressure value PS1+α, and the set pressure PA of the signal pressure variable relief valve 16 is controlled to satisfy the following expressions by the spring 16*a*, the absolute pressure PGR applied to the pressure receiving element 16*b* and the track operating signal pressure Ptpi applied to the pressure receiving element 16*c*.

When the track operating signal pressure Ptpi applied to the pressure receiving element 16*c* is the tank pressure—

$$PA1=PS1+\alpha-PGR$$

When the track operating signal pressure Ptpi applied to the pressure receiving element 16*c* is equal to or greater than the tank pressure—

$$\begin{aligned} PA2 &= PS1+\alpha+\Delta Pt2-PGR \\ &= PS1+\alpha+\Delta Pt1-PGR \\ &= PS2+\alpha-PGR \end{aligned}$$

Transformation of the above expressions gives:

$$PA1=PS1-(PGR-\alpha)$$

$$PA2=PS2-(PGR-\alpha)$$

where α is an LS control adjustment value greater than 0, but less than PGR (i.e., $0<\alpha<PGR$).

Briefly, in both of the cases where neither the track operating device 124*a* nor 124*b* is actuated and where at least one of the track operating devices 124*a* and 124*b* is actuated, the set pressures PA1 and PA2 of the signal pressure variable relief valve 16 are controlled to be lower than the set pressures PS1 and PS2, respectively, of the main relief valve 14 by PGR−α. Since $0<\alpha<PGR$ as shown above, PGR−α takes a value smaller than the target LS differential pressure PGR (the target differential pressure for load-sensing control).

In other words, the signal pressure variable relief valve 16 is configured such that: when neither the track operating device 124*a* nor 124*b* is actuated and the set pressure PS of the main relief valve 14 takes the first value PS1, the set pressure PA1 of the signal pressure variable relief valve 16 is the third value PA1 smaller than the first value PS1 of the set pressure PS of the main relief valve 14; when at least one of the track operating devices 124*a* and 124*b* is actuated and the set pressure PS of the main relief valve 14 increases to the second value PS2, the set pressure PA of the signal pressure variable relief valve 16 increases from the third value PA1 to the fourth value PA2 smaller than the second value PS2 of the set pressure PS of the main relief valve 14; and the difference ΔPt1 between the first value PS1 of the set pressure PS of the main relief valve 14 and the third value PA1 of the set pressure PA of the signal pressure variable relief valve, and the difference between the second value PS2 of the set pressure PS of the main relief valve 14 and the fourth value PA2 of the set pressure PA of the signal pressure variable relief valve 16 are both controlled to be smaller than the target differential pressure PGR for load-sensing control.

In addition, the signal pressure variable relief valve 16 is configured to ensure that the absolute pressure PGR applied to the pressure receiving element 16*b* is introduced as the target LS differential pressure into the regulator 12, and thus that as the target LS differential pressure PGR (the target differential pressure for load-sensing control) decreases, the third value PA1 and fourth value PA2 of the set pressure increases and the absolute pressure Pls output from the differential pressure reducing valve 11, that is, the differential pressure between the delivery pressure of the main pump 2 and the highest load pressure Plmaxa in the downstream side of the restrictor 17, decreases.

FIG. 3 is an external view of the hydraulic excavator including the hydraulic driving system described above.

Referring to FIG. 3, the hydraulic excavator well known as a work machine, includes a lower track structure 101, an upper swing structure 109, and a front work implement 104 of a swing type. The front work implement 104 is constituted by a boom 104*a*, an arm 104*b*, and a bucket 104*c*. The upper swing structure 109 is designed to swing with respect to the lower track structure 101 via a swing motor 3*c*. A swing post 103 is installed at a front section of the upper swing structure 109, and the front work implement 104 is attached to the swing post 103 so as to be movable vertically. The swing post 103 can be turned in a horizontal direction with respect to the upper swing structure 109 by extending/retracting a swing cylinder 3*e*, and the boom 104*a*, arm 104*b*, and bucket 104*c* of the front work implement 104 can be turned in a vertical direction by extending/retracting a boom cylinder 3*a*, an arm cylinder 3*b*, and a bucket cylinder 3*d*, respectively. A blade 106 actuated vertically by extension/retraction of a blade cylinder 3*h* is attached to a central frame of the lower track structure 101. Rotation of track motors 3*f* and 3*g* drives left and right crawlers 101*a* and 101*b*, respectively, thus causing the lower track structure 101 to travel.

The upper swing structure 109 includes a cabin 108 of a canopy type. The cabin 108 includes therein an operator's seat 121, left and right operating devices 122 and 123 for front work/swinging (only the left operating device is shown in FIG. 3), track operating devices 124*a* and 124*b* (only the left operating device is shown in FIG. 3), a swing operating device 125 (see FIG. 1), a blade operating device 126 (see FIG. 1), a gate lock lever 24, and more. Control levers of the operating devices 122 and 123 can each be operated in any direction from a neutral position, with a cross direction taken as its reference. When the control lever of the left operating device 122 is operated forward or backward, the operating device 122 functions as an operating device 122*b* for swinging purposes (see FIG. 1), and when the control lever of the left operating device 122 is operated leftward or rightward, the operating device 122 functions as an arm operating device 122*a* (see FIG. 1). When the control lever of the right operating device 123 is operated forward or backward, the operating device 123 functions as a boom operating device 123*a* (see FIG. 1), and when the control lever of the right operating device 123 is operated leftward or rightward, the operating device 123 functions as a bucket operating device 123*b* (see FIG. 1).

—Comparative Example—

FIG. 4 is a diagram showing a comparative example. In the comparative example, the signal pressure variable relief valve 16 in the hydraulic driving system of the present embodiment, shown in FIG. 1, is replaced by the signal pressure variable relief valve 116 described in Patent Document 1. In other words, as described in Patent Document 1, in the hydraulic driving apparatus of the load-sensing control system with the signal pressure variable relief valve 116 on the highest load pressure line 35, the main relief valve 14 is configured as a variable relief valve such that as described in Patent Document 2, during track operation the set pressure of the main relief valve 14 increases from the first value PS1 to the second value PS2.

The signal pressure variable relief valve 116 in FIG. 4 does not include the pressure receiving element 16*c* in the present embodiment shown in FIG. 1. Accordingly the signal pressure variable relief valve 116 has its set pressure PA controlled to satisfy the following relationship with respect to the output pressure (absolute pressure) PGR of the prime mover revolution speed detection valve 13, applied to the pressure receiving element 16*b*.

$$PA=PS1+\alpha-PGR$$

Transformation of the above expression gives:

$$PA=PS1-(PGR-\alpha)$$

As described above, PS1 is the set pressure of the main relief valve 14 that applies when neither the track operating device 124*a* nor 124*b* is actuated, and PS1+α is the pressure value set by the spring constant of the spring 16*a*. In the above expressions, α is an LS control adjustment value greater than 0, but less than PGR.

Other constituent elements of the apparatus shown as the comparative example in FIG. 4 are substantially the same as those of the hydraulic driving system of the present embodiment, shown in FIG. 1.

In the comparative example, since the signal pressure variable relief valve 116 is provided, when neither the track operating device 124*a* nor 124*b* is actuated and the track operating signal pressure Ptpi is the tank pressure, the highest load pressure Plmaxa that has been introduced into the differential pressure reducing valve 11 is limited to the set pressure of PS1−(PGR−α) of the signal pressure variable relief valve 116 by an action of the signal pressure variable relief valve 116, so that the absolute pressure Pls output from the differential pressure reducing valve 11 does not become zero (0) even after a cylinder-type actuator such as the boom cylinder 3*a* has reached its stroke end. For this reason, during combined actuator operations in that state, none of the other actuators stops operating.

The comparative example, however, might pose the following problems.

The main relief valve 14 increases the set pressure thereof from PS1 to PS2, only when at least one of the track operating devices 124*a* and 124*b* is actuated and the track operating signal pressure Ptpi equals or exceeds the threshold level Ptr. This increase is intended to ensure the output torque required of the track motors 3*f* and 3*g* during machine traveling, and thereby to enhance traveling performance.

In the configuration of the comparative example 1, however, if during track operation any impacts, such as an obstacle or inclination of a slope climbing travel surface, cause the track motor 3*f* or 3*g* to stop, load-sensing control acts to limit the delivery pressure Pp of the main pump 2 to a pressure obtained by adding the target differential pressure PGR of load-sensing control to the highest load pressure Plmaxa that is lower than the second value PS2 of the set pressure of the main relief valve 14 and limited by the signal pressure variable relief valve 116. As a result, the load pressure of the track motor 3*f* or 3*g* fails to increase to the second value PS2 of the set pressure of the main relief valve 14. This disadvantageously fails to secure the enough amount of output torque of the track motor 3*f* or 3*g* utilizing the increase in the set pressure of the main relief valve 14.

Left side (a) of FIG. 5 represents the relationship between the delivery pressure Pp of the main pump 2 that is obtained in the comparative example of FIG. 4 when the control lever of a non-track operating device is operated and the delivery pressure Pp of the main pump 2 reaches the set pressure PS1 of the main relief valve 14, and the highest load pressure Plmaxa in which a maximum pressure is limited by the signal pressure variable relief valve 116.

When an actuator other than the track motors 3*f* and 3*g*, such as the boom cylinder 3*a*, reaches the stroke end, as shown in left side (a) of FIG. 5 the load pressure of this actuator increases and the delivery pressure Pp of the main pump 2 increases to the first value PS1 of the set pressure. At this time, the highest load pressure Plmaxa in the downstream side of the restrictor 17 on the highest load pressure line 35 is limited to PS1−(PGR−α) by the signal pressure variable relief valve 116 and this highest load pressure Plmaxa is introduced into the differential pressure reducing valve 11. The absolute pressure Pls output from the differential pressure reducing valve 11 is introduced into the pressure compensating valves 7*a* to 7*h* as a target compensation differential pressure. At this time, since the target compensation differential pressure (Pp−Plmaxa) is held at a value greater than 0 but less than PGR, the pressure compensating valves 7*a* to 7*h* do not fully close, in which state a plurality of any other actuators can be operated in combination.

In addition, the absolute pressure PGR output from the prime mover revolution speed detection valve 13 to become a target LS differential pressure is introduced into the pressure receiving element 16*b* of the signal pressure variable relief valve 116. At any prime mover revolution speed, therefore, the highest load pressure Plmaxa is limited to PS1−(PGR−α) by the signal pressure variable relief valve 116, which means that irrespective of the revolution speed of the prime mover 1, appropriate performance characteristics can be obtained during combined operation.

Meanwhile, when at least one of the track operating devices 124*a* and 124*b* is actuated and the track operating signal pressure Ptpi equals or exceeds the threshold level Ptr, the track operating signal pressure Ptpi increases the set pressure of the main relief valve 14 from the first value PS1 to the second value PS2.

Right side (b) of FIG. 5 represents the relationship between the delivery pressure Pp of the main pump 2 that is obtained in the comparative example of FIG. 4 after at least one of the track operating devices 124*a* and 124*b* has been actuated and the track operating signal pressure Ptpi has equaled or exceeded the threshold level Ptr to cause the delivery pressure Pp to reach the set pressure PS2 of the main relief valve 14, and the highest load pressure Plmaxa in which the maximum pressure is limited by the signal pressure variable relief valve 116.

An obstacle, inclination of a slope climbing travel surface, or any other impacts may cause the track motor 3*f* or 3*g* to stop. As shown in right side (b) of FIG. 5, the load pressure of the track motor 3*f* or 3*g* increases with operation of the track control lever and consequently the delivery pressure Pp of the main pump 2 temporarily increases to PS2.

At the same time, however, the highest load pressure Plmaxa is limited to PS1−(PGR−α) by the signal pressure variable relief valve 116, as described above, and the absolute pressure Pls (Pp-Plmaxa) output from the differential pressure reducing valve 11, therefore, becomes PGR+(PS2−PS1)−α. Since PS2−PS1=ΔPt1, ΔPt1 is usually set to be a value larger than PGR, the target LS differential pressure. For this reason, the absolute pressure Pls becomes higher than the target LS differential pressure.

Sine PGR is introduced into a lower left end of FIG. 4 that shows the LS control valve 12*b* included in the regulator 12 of the main pump 2, and since Pls is introduced into a middle right end of FIG. 4, if Pls>PGR, the LS control valve 12*b* is pushed leftward in FIG. 4 to switch to a right-side position and thus a primary pilot pressure held at a fixed value by the pilot relief valve 32 is introduced into the LS control piston 12*c* via the LS control valve 12*b* and reduces the tilting of the main pump 2 by means of the LS control piston 12*c*. The reduction in the tilting of the main pump 2 continues until Pls has equaled PGR. This results in the delivery pressure Pp of the main pump 2 decreasing to PS1+α and maintained at this pressure level, as demonstrated in (b) of FIG. 5.

This means that the load pressure of the track motor 3*f* or 3*g* does not increase to the set pressure PS2 of the main relief valve 14, and thus there occurs the problem that the necessary output torque of the track motor 3*f* or 3*g* cannot be obtained despite the fact that the main relief valve 14 is made variable.

—Operation—

Next, operation of the present embodiment shown in FIG. 1 will be described.

First, the hydraulic fluid that has been delivered from the fixed displacement pilot pump 30 driven by the prime mover 1 is supplied to the hydraulic fluid supply line 31*a*. The prime mover revolution speed detection valve 13 is connected to the hydraulic fluid supply line 31*a*, and the prime mover revolution speed detection valve 13 outputs, through the flow rate detection valve 50 and the differential pressure reducing valve 51, the differential pressure across the flow detection valve 50 that is commensurate with the delivery flow rate of the pilot pump 30, as an absolute pressure PGR (a target LS differential pressure). Downstream of the prime mover revolution speed detection valve 13 is disposed the pilot relief valve 32, which generates a constant pilot pressure (primary pilot pressure) Ppi in the pilot hydraulic fluid supply line 31*b*.

(a) When the control levers of all operating devices are in neutral position

When the control levers of all operating devices are in neutral position, the tank pressure is introduced into the pressure receiving element 14*b* of the main relief valve 14 and the pressure receiving element 16*c* of the signal pressure variable relief valve 16 via the shuttle valves 70*a*, 70*b*, and 70*c* of the track operation detection circuit 70, and the signal pressure lines 36, 36*a*, and 36*b*. At this time, as shown in FIG. 2, the set pressure of the main relief valve 14 is the first value PS1 that has been set for the spring 14*a*, and the set pressure of the signal pressure variable relief valve 16 becomes the third value PA1, that is, PS1−(PGR−α), that has been set for the spring 16*a* and the pressure receiving element 16*b*.

In addition, the control levers of all operating devices are in neutral position and thus, all flow control valves 6*a* to 6*h* are also set to neutral position. Since the flow control valves 6*a* to 6*h* are all set to neutral position, the highest load pressure detection circuit 9 detects the tank pressure as the highest load pressure Plmax, which is then introduced into the unloading valve 15.

Since the tank pressure is introduced as the highest load pressure Plmax into the unloading valve 15, if it is assumed that the tank pressure is 0, the set pressure of the unloading valve 15 has a value obtained by adding, to the conversion value of the urging force of the spring 15*b*, the output pressure PGR (target LS differential pressure) of the prime mover revolution speed detection valve 13 that is applied to the pressure receiving element 15*a* of the unloading valve 15, and the pressure Pp of the hydraulic fluid supply line 5, based on its set pressure, is held at a pressure value obtained by adding the conversion value of the urging force of the spring 15*b* to the target LS differential pressure PGR, that is, Pp>PGR holds.

In addition, the highest load pressure Plmax is introduced into the downstream side of the restrictor 17 via the restrictor 17, and the highest load pressure Plmaxa in the downstream side of the restrictor 17 is introduced into the differential pressure reducing valve 11 and the signal pressure variable relief valve 16. As described above, the set pressure of the signal pressure variable relief valve 16 at this time is PS1−(PGR−α), which is much higher than the Plmax held at the tank pressure. Accordingly, Plmax is not limited by the signal pressure variable relief valve 16 and this results in Plmaxa=Plmax.

The differential pressure reducing valve 11 outputs the differential pressure (Pp−Plmaxa) between the pressure Pp of the hydraulic fluid supply line 5 (i.e., the delivery pressure of the main pump 2) and the highest load pressure Plmaxa (=Plmax), as the absolute pressure Pls.

When the control levers of all operating devices are in neutral position, since Plmaxa (=Plmax) is the tank pressure as described above, a relationship of Pls=Pp−Plmaxa=Pp>PGR holds if it is assumed that the tank pressure is 0.

The absolute pressure Pls that has been output from the differential pressure reducing valve 11 is introduced as a feedback LS differential pressure into the LS control valve 12*b* of the regulator 12. The LS control valve 12*b* compares Pls and PGR. Since Pls>PGR, the LS control valve 12*b* is then pushed leftward in FIG. 1 to switch to a right-side position and introduce a constant primary pilot pressure Ppi created by the pilot relief valve 32 into the LS control piston 12*c*. The capacity (flow rate) of the main pump 2 is maintained at a minimum because the constant primary pilot pressure Ppi is introduced into the LS control piston 12*c*.

(b) When the control lever of a non-track operating device is operated

When the control lever of a non-track operating device is operated, as in case (a) described above the tank pressure is introduced into the pressure receiving element 14*b* of the main relief valve 14 and the pressure receiving element 16*c* of the signal pressure variable relief valve 16 via the shuttle valves 70*a*, 70*b*, and 70*c* of the track operation detection circuit 70 and the signal pressure lines 36, 36*a*, and 36*b*. At this time, as shown in FIG. 2, the set pressure of the main relief valve 14 is the first value PS1 that was set for the spring 14*a*, and the set pressure of the signal pressure variable relief valve 16 becomes the third value PA1, that is, PS1−(PGR−α), that was set for the spring 16*a* and the pressure receiving element 16*b*.

Consider a case in which the control lever of a non-track operating device, such as the boom control lever, is operated.

When the boom control lever is operated in a direction that the boom cylinder 3*a* becomes extended, that is, in a direction that the boom faces upward, an operating pilot pressure a1 for the boom is output from the pilot valve unit 60*a* for the boom and consequently the flow control valve 6*a* switches rightward in FIG. 1. Upon switching of the flow control valve 6*a* from its neutral position, the hydraulic fluid is supplied to the boom cylinder 3*a*. At the same time, the load pressure of the boom cylinder 3*a* is detected as the highest load pressure Plmax via the load port of the flow control valve 6*a* by the highest load pressure detection circuit 9 including the shuttle valves 9*a*, 9*b*, 9*c*, 9*d*, 9*e*, 9*f*, and 9*g*, and then the highest load pressure Plmax is introduced into the unloading valve 15. The highest load pressure Plmax is also introduced into the downstream side of the restrictor 17, and in the downstream side of the restrictor 17, the highest load pressure Plmaxa is introduced into the differential pressure reducing valve 11 and the signal pressure variable relief valve 16.

Since the highest load pressure Plmax is introduced into the unloading valve 15, the set pressure of the unloading valve 15 increases to the pressure of (PGR+conversion value of the urging force of the spring 15*b*+Plmax), obtained by adding three factors, namely the output pressure (target LS differential pressure) PGR of the prime mover revolution speed detection valve 13 that is applied to the pressure receiving element 15*a*, the conversion value of the urging force of the spring 15*b*, and the highest load pressure Plmax (the load pressure at a bottom side of the boom cylinder 3*a*). This increase interrupts the fluid line provided to discharge the hydraulic fluid within the hydraulic fluid supply line 5 into the tank.

The set pressure of the signal pressure variable relief valve 16, on the other hand, is PS1−(PGR−α) as described above, and thus the maximum pressure of the highest load pressure Plmaxa in the downstream side of the restrictor 17 is limited to PS1−(PGR−α).

The differential pressure reducing valve 11 outputs the differential pressure (Pp−Plmaxa) between the pressure Pp of the hydraulic fluid supply line 5 (i.e., the delivery pressure of the main pump 2) and the highest load pressure Plmaxa, as the absolute pressure Pls. The absolute pressure Pls is then introduced as a feedback LS differential pressure into the LS control valve 12*b* of the regulator 12. The LS control valve 12*b* compares Pls and PGR.

Immediately after the control lever for raising the boom has been operated, the delivery pressure Pp of the main pump 2 is lower than the load pressure of the boom cylinder 3*a* (i.e., Pp<Plmax), so that the absolute pressure (feedback LS differential pressure) Pls that is output from the differential pressure reducing valve 11 is derived as Pls=Pp−Plmaxa<PGR.

Since Pls<PGR, the LS control valve 12*b* of the regulator 12 is pushed rightward in FIG. 1. The LS control valve 12*b*, therefore, switches to a left position and after releasing the hydraulic fluid from the LS control piston 12*c* to the tank, increases the tilting (capacity) of the main pump 2. This increase in the tilting of the main pump 2 continues until Pls=PGR, that is, Pp=Plmaxa+PGR has been achieved.

The hydraulic fluid that has been delivered from the main pump 2 to the hydraulic fluid supply line 5 is supplied to the bottom side of the boom cylinder 3*a* via the pressure compensating valve 7*a* and the flow control valve 6*a*. This extends the boom cylinder 3*a*. Upon extension of the boom cylinder 3*a* to the stroke end, the load pressure of the boom cylinder 3*a* and the pressure Pp of the hydraulic fluid supply line 5 (i.e., the delivery pressure of the main pump 2) increase to the set pressure PS1 of the main relief valve 14.

Left side (a) of FIG. 6 represents the relationship between the delivery pressure Pp of the main pump 2 that is obtained when the control lever of a non-track operating device is operated and the delivery pressure Pp reaches the set pressure PS1 of the main relief valve 14, and the highest load pressure Plmaxa in which the maximum pressure is limited by the signal pressure variable relief valve 16.

As shown in left side (a) of FIG. 6, the pressure Pp of the hydraulic fluid supply line 5, that is, the delivery pressure Pp of the main pump 2, increases to PS1 because the set pressure of the main relief valve 14 is PS1.

In the meantime, since the set pressure of the signal pressure variable relief valve 16 is PS1−(PGR−α), the highest load pressure Plmaxa in the downstream side of the restrictor 17 is limited to the set pressure of PS1−(PGR−α). The absolute pressure Pls output from the differential pressure reducing valve 11 is consequently given as follows:

$$Pls=Pp-Plmaxa=PS1-(PS1-(PGR-\alpha))=PGR-\alpha$$

where α is a value larger than 0, but less than PGR as described earlier herein, and thus $$0<Pls<PGR$$

is obtained.

Accordingly, even after the boom cylinder 3*a* has reached the stroke end and the load pressure of the boom cylinder 3*a* has reached the set pressure PS1 of the main relief valve 14, the feedback LS differential pressure Pls does not become 0. The pressure compensating valves 7*a* to 7*h* do not fully close, and even during combined actuator operations in that state, none of the other actuators stops operating.

In addition, the absolute pressure PGR that has been output from the prime mover revolution speed detection valve 13 and becomes the target LS differential pressure is introduced into the pressure receiving element 16*b* of the signal pressure variable relief valve 16, and as the target LS differential pressure PGR decreases, the third value PA1 and fourth value PA2 of the set pressure of the signal pressure variable relief valve 16 increase, which in turn reduces the absolute pressure Pls (differential pressure between the delivery pressure Pp of the main pump 2 and the highest load pressure Plmaxa in the downstream side of the restrictor 17) that is output from the differential pressure reducing valve 11. For this reason, even if change in prime mover revolution speed causes the target LS differential pressure PGR to change to any value, the maximum pressure of the highest load pressure Plmaxa is limited to PS1−(PGR−α) by the signal pressure variable relief valve 16 and thus the differential pressure Pls between the delivery pressure Pp of the main pump 2 and the highest load pressure Plmaxa in the downstream side of the restrictor 17 changes according to the particular target LS differential pressure PGR. Irrespective of the revolution speed of the prime mover 1, therefore, appropriate performance characteristics can be obtained during combined operation.

(c) When the control lever of at least one of the track operating devices is operated When the control lever of at least one of the track operating devices 124*a* and 124*b* is operated, if, after selection of a higher pressure by a corresponding one of the shuttle valves 70*a*, 70*b*, and 70*c* of the track operation detection circuit 70, the track operating signal pressure Ptpi that has been introduced into the pressure receiving element 14*b* of the main relief valve 14 and the pressure receiving element 16*c* of the signal pressure variable relief valve 16 equals or exceeds the threshold level Ptr, then as shown in FIG. 2, the set pressure of the main relief valve 14 increases to PS2 obtained by adding ΔPt, a value that has been set by application of the track operating signal pressure Ptpi of the pressure receiving element 16*c*, to the first actuator value PS1 that has been set for the spring 14*a*. In addition, the set pressure of the signal pressure variable relief valve 16 increases to PS2+α−PGR, that is, PA2 obtained by adding ΔPt, the value that was set by the application of the track operating signal pressure Ptpi of the pressure receiving element 16*c*, to the third value PA1 that has been set for the spring 16*a* and the pressure receiving element 16*b*.

Consider here a case in which the pilot valve (pressure reducing valve), shown in the left of the relevant figure and constituting a part of the left-track pilot valve unit 60*f* for the track operating device 124*a*, is operated. Since the operating pilot pressure f1 of the pilot valve is introduced into the left side of the flow control valve 6*f* in FIG. 1, the flow control valve 6*f* is pushed rightward to switch to a left position in the figure. This causes the hydraulic fluid to be supplied to a left port of the left-track motor 3*f*, shown in FIG. 1. In addition, the load pressure upon the left-track motor 3*f* is detected as a highest load pressure Plmax via the load port of the flow control valve 6*f* via the shuttle valves 9*e*, 9*f*, 9*g* and then the highest load pressure Plmax is introduced into the unloading valve 15. The highest load pressure Plmax is also introduced into the downstream side of the restrictor 17, and in the downstream side of the restrictor 17, then the highest load pressure Plmaxa is introduced into the differential pressure reducing valve 11 and the signal pressure variable relief valve 16.

Since the highest load pressure Plmax is introduced into the unloading valve 15, the set pressure of the unloading valve 15 increases to the pressure of (PGR+conversion value of the urging force of the spring 15*b*+Plmax), obtained by adding three factors, namely the output pressure PGR (target LS differential pressure) of the prime mover revolution speed detection valve 13 that is applied to the pressure receiving element 15*a*, the conversion value of the urging force of the spring 15*b*, and the highest load pressure Plmax (the load pressure upon the left-track motor 3*f*). This increase interrupts the fluid line provided to discharge the hydraulic fluid within the hydraulic fluid supply line 5 into the tank.

If the track operating signal pressure Ptpi is equal to or above the threshold level Ptr, on the other hand, the set pressure of the signal pressure variable relief valve 16 is PS2−(PGR−α) as described above, and thus the maximum pressure of the highest load pressure Plmaxa in the downstream side of the restrictor 17 is limited to PS2−(PGR−α).

The differential pressure reducing valve 11 outputs the differential pressure (Pp−Plmaxa) between the pressure Pp of the hydraulic fluid supply line 5 (i.e., the delivery pressure of the main pump 2) and the highest load pressure Plmaxa in the downstream side of the restrictor 17, as the absolute pressure Pls. The absolute pressure Pls is then introduced as a feedback LS differential pressure into the LS control valve 12*b* of the regulator 12.

The LS control valve 12*b* compares Pls and PGR as in above case (b), and controls the tilting of the main pump 2 such that Pls equals PGR. The hydraulic fluid that has been delivered from the main pump 2 to the hydraulic fluid supply line 5 is supplied to the left-track motor 3*f* via the pressure compensating valve 7*f* and the flow control valve 6*f*, thereby rotating the left-track motor 3*f*.

During motor rotation, if an obstacle, inclination of a slope climbing travel surface, or any other impacts cause the left-track motor 3*f* to stop, the load pressure of the left-track motor 3*f* and the pressure Pp of the hydraulic fluid supply line 5 (i.e., the delivery pressure of the main pump 2) both increase. If the track operating signal pressure Ptpi is equal to or above the threshold level Ptr, the set pressure of the main relief valve 14 increases to PS2 as shown in FIG. 2. The pressure Pp of the hydraulic fluid supply line 5 (i.e., the delivery pressure of the main pump 2) also increases to PS2.

Right side (b) of FIG. 6 represents the relationship between the delivery pressure Pp of the main pump 2 that is obtained after at least one of the track operating devices has been actuated and the track operating signal pressure Ptpi has equaled or exceeded the threshold level Ptr to cause the delivery pressure Pp to reach the set pressure PS2 of the main relief valve 14, and the highest load pressure Plmaxa in which the maximum pressure is limited by the signal pressure variable relief valve 16.

The set pressure of the main relief valve 14 is PS2 as shown in right side (b) of FIG. 6, and thus the pressure Pp of the hydraulic fluid supply line 5 (i.e., the delivery pressure of the main pump 2) also increases to PS2.

In the meantime, since the set pressure of the signal pressure variable relief valve 16 is PS2−(PGR−α), the highest load pressure Plmaxa in the downstream side of the restrictor 17 is limited to the set pressure of PS2−(PGR−α). The absolute pressure Pls output from the differential pressure reducing valve 11 is consequently given as follows:

$$Pls=Pp-\mathrm{Plmaxa}=PS2-(PS1-(PGR-\alpha))=PGR-\alpha$$

where α is a value larger than 0, but less than PGR as described above, and hence $$0<\mathrm{Pls}<\mathrm{PGR}$$

is obtained.

Since Pls<PGR, the LS control valve 12*b* of the regulator 12 is pushed rightward in FIG. 1. The LS control valve 12*b*, therefore, switches to the left position and after releasing the hydraulic fluid from the LS control piston 12*c* to the tank, increases the tilting (capacity) of the main pump 2. This increase in the tilting of the main pump 2 continues until Pls=PGR, that is, Pp=Plmaxa+PGR has been achieved.

That is to say, when the load pressure of the left-track motor 3*f* makes an attempt to reach the set pressure PS2 of the main relief valve 14, the signal pressure variable relief valve 16 works to limit the highest load pressure Plmaxa to PS2−(PGR−α) and hence cause the feedback LS differential pressure Pls to become equal to PGR−α (i.e., as in the comparative example of FIG. 5, Pls does not become higher than PGR). Accordingly the delivery pressure from the main pump 2 (the load pressure of the left-track motor 3*f*) increases to the set pressure PS2 of the main relief valve 14, and as in the comparative example, failure of the load pressure of the left-track motor 3*f* to reach PS2 due to the load-sensing control of the main pump 2 does not arise.

Furthermore, if the load pressure of the left-track motor 3*f* reaches the set pressure PS2 of the main relief valve 14, the absolute pressure Pls output from the differential pressure reducing valve 11 as the target compensation differential pressure does not become 0, so that even during combined actuator operations in that state, none of the other actuators stops operating.

In addition, as in above case (b) in which a non-track operating device's control lever is operated, since the absolute pressure PGR that has been output from the prime mover revolution speed detection valve 13 and becomes the target LS differential pressure is introduced into the pressure receiving element 16*b* of the signal pressure variable relief valve 16, even if change in prime mover revolution speed causes the target LS differential pressure PGR to change to any value, the maximum pressure of the highest load pressure Plmaxa is limited by the signal pressure variable relief valve 16 according to the target LS differential pressure PGR. Irrespective of the revolution speed of the prime mover 1, therefore, appropriate performance characteristics can be obtained during combined operation.

Moreover, in the present embodiment, when the set pressure of the signal pressure variable relief valve 16 increases from the third value PA1 to the fourth value PA2, the set pressure increases by ΔPt2, the same value as the value ΔPt1 by which the set pressure of the main relief valve 14 increases from the first value PS1 to the second value PS2. Accordingly, when the state in which an actuator other than the track motors 3*f* and 3*g* is driven is shifted to the combined operation for simultaneous driving of the track motors 3*f* and 3*g* and then an increase in the load pressure of at least one of the track motors 3*f* and 3*g* causes the delivery pressure Pp from the main pump 2 to increase to the second value PS2 of the set pressure of the main relief valve 14, the differential pressure between the delivery pressure Pp of the main pump 2 and the highest load pressure Plmaxa is maintained at the same value before and after the delivery pressure Pp of the main pump 2 increases to PS2. For this reason, before and after the delivery pressure Pp of the main pump 2 increases to the second value PS2, the target compensation differential pressure across at least one of the pressure compensating valves 7*a* to 7*h* remains invariant, which in turn maintains a current operating speed of the particular actuator other than the track motors 3*f* and 3*g*, and provides appropriate performance characteristics during the combined operation.

—Advantages—

As set forth above, in the present embodiment, the signal pressure variable relief valve 16 includes the second pressure receiving element 16*c* in the side operative in the valve closing direction, and when the track operating signal pressure Ptpi applied to the second pressure receiving element 16*c* equals or exceeds the threshold level Ptr, as the set pressure of the main relief valve 14 increases from PS1 to PS2, the set pressure of the signal pressure variable relief valve 16 timely increases from PA1 to PA2 (=PS2−(PGR−α)). Thus, when the load pressure of the left-track motor 3*f* makes an attempt to reach the set pressure PS2 of the main relief valve 14, the relationship of Pls<PGR can be obtained by the action of the signal pressure variable relief valve 16. As shown in right side (b) of FIG. 6, therefore, load-sensing control enables the delivery pressure Pp of the main pump 2 to increase to PS2, ensures the output torque required of the track motors 3*f* and 3*g* during machine traveling, and enhances traveling performance.

In addition, even after the load pressure of the left-track motor 3*f* has reached the second set pressure PS2 of the main relief valve 14, the absolute pressure Pls output from the differential pressure reducing valve 11 as the target compensation differential pressure does not become 0, so that even during combined actuator operations in that state, none of the other actuators stops operating and appropriate performance characteristics are maintained.

Furthermore, since the absolute pressure PGR that has been output from the prime mover revolution speed detection valve 13 and becomes the target LS differential pressure is introduced into the pressure receiving element **16*b* of the signal pressure variable relief valve 16, even if change in prime mover revolution speed causes the target LS differential pressure PGR to change to any value, the maximum pressure of the highest load pressure Plmaxa is limited to PS1−(PGR−α) by the signal pressure variable relief valve 16. Irrespective of the revolution speed of the prime mover 1**, therefore, appropriate performance characteristics can be obtained during combined operation.

Moreover, when the set pressure of the signal pressure variable relief valve 16 increases from the third value PA1 to the fourth value PA2, the set pressure increases by ΔPt2, the same value as the value ΔPt1 by which the set pressure of the main relief valve 14 increases from the first value PS1 to the second value PS2. Accordingly, when the state in which an actuator other than the track motors **3*f* and 3*g* is driven is shifted to the combined operation for the simultaneous driving of the track motors 3*f* and 3*g* and then the increase in the load pressure of at least one of the track motors 3*f* and 3*g* causes the delivery pressure Pp from the main pump 2 to increase to the second value PS2 of the set pressure of the main relief valve 14, the differential pressure between the delivery pressure Pp of the main pump 2 and the highest load pressure Plmaxa is maintained at the same value before and after the delivery pressure Pp of the main pump 2 increases to PS2. For this reason, before and after the delivery pressure Pp of the main pump 2 increases to PS2, the target compensation differential pressure across at least one of the pressure compensating valves 7*a* to 7*h* remains invariant, which in turn maintains a current operating speed of the particular actuator other than the track motors 3*f* and 3*g***, and provides appropriate performance characteristics during the combined operation.

—Others—

An example in which the construction machine is a hydraulic excavator and the specific actuator operated to increase the set pressure of the main relief valve 14 is one of the track motors **3*f* and 3*g* has been described in the present embodiment. This specific actuator may however be an actuator other than the track motors, or the number of specific actuators operated to increase the set pressure of the main relief valve 14 may be one, two, or more. For example, this number may be one, that is, at least one of the boom cylinder 3*a*, the arm cylinder 3*b* and the bucket cylinder 3*d*. When these actuators are operated, increasing the set pressure of the main relief valve 14** enables, for example, an excavation force or working speed/rate to be increased during excavation and loading, and working efficiency to be raised.

The present invention may also be applied to any construction machine other than a hydraulic excavator, only if the construction machine includes actuators that are preferably designed such that they can be driven with a greater force by increasing a set pressure of a main relief valve 14.

In addition, as described above in the embodiment, the construction machine includes the differential pressure reducing valve 11 configured to output the absolute pressure as the differential pressure between the delivery pressure of the main pump 2 and the highest load pressure Plmaxa, introduces the output pressure Pls into at least one of the pressure compensating valves **7*a* to 7*h*, sets the target compensation differential pressure, and introduces the target compensation differential pressure into the LS control valve 12*b* as the feedback differential pressure. The machine, however, may instead exclude the differential pressure reducing valve 11, introduce the delivery pressure of the main pump 2 and the highest load pressure into at least one of the pressure control valves 7*a* to 7*h* and the LS control valve 12*b*** through independent fluid lines.

Furthermore, in the embodiment, while the absolute pressure PGR output from the prime mover revolution speed detection valve 13 has been used as the basis for setting the target LS differential pressure as the value that changes according to the particular revolution speed of the prime mover 1, the target LS differential pressure may be a fixed value if there is no need to change the target LS differential pressure according to the revolution speed of the prime mover 1.

Moreover, in the embodiment, when the set pressure of the signal pressure variable relief valve 16 increases from the third value PA1 to the fourth value PA2, although the set pressure increases by ΔPt2, the same value as the value ΔPt1 by which the set pressure of the main relief valve 14 increases from the first value PS1 to the second value PS2, ΔPt2 may not need to be the same value as the value ΔPt1, if the difference between the fourth value PA2 obtained after the set pressure of the signal pressure variable relief valve 16 has increased, and the second value PS2 of the set pressure of the main relief valve 14, is smaller than the target LS differential pressure PGR. For example, ΔPt2 may be set to be smaller than ΔPt1, in which case, when the current state of the machine is shifted to combined traveling operations, the differential pressure Pls between the delivery pressure Pp of the main pump 2 and the highest load pressure Plmaxa decreases, which renders traveling slower and hence enables safety to be enhanced during the combined traveling operations.

DESCRIPTION OF REFERENCE NUMBERS

1: Prime mover
2: Main pump (Hydraulic pump)
**3*a* to 3*h***: Actuators
**3*f* and 3*g***: Track motors (Specific actuators)
4: Control valve unit
**6*a* to 6*h***: Flow control valves
**7*a* to 7*h***: Pressure compensating valves
9: Highest load pressure detection circuit
12: Regulator (Pump control device)
**12*c***: LS control piston (Capacity control actuator)
**12*d***: Torque control piston (Capacity control actuator)
14: Main relief valve
**14*b***: Pressure receiving element of the main relief valve (First pressure receiving element)
15: Unloading valve
16: Signal pressure variable relief valve (Signal pressure relief valve)
**16*c***: Pressure receiving element of the signal pressure variable relief valve (Second pressure receiving element)
17: Restrictor
35: Highest load pressure line
70: Track operation detection circuit
**124*a* and 124*b***: Track operating devices

The invention claimed is:

1. A hydraulic driving system for a construction machine, comprising:

a hydraulic pump of variable displacement type driven by a prime mover;

a plurality of actuators each driven by a hydraulic fluid delivered from the hydraulic pump;

a plurality of flow control valves that each control a flow rate of the hydraulic fluid supplied from the hydraulic pump to a corresponding one of the plurality of actuators;

a plurality of pressure compensating valves each for controlling a differential pressure across a corresponding one of the flow control valves independently such that the differential pressure across the corresponding flow control valve equals a target compensation differential pressure;

a pump control device for controlling a capacity of the hydraulic pump by load-sensing control such that a delivery pressure of the hydraulic pump becomes higher by a target differential pressure than a highest load pressure of the plurality of actuators;

a main relief valve that limits a maximum pressure of the delivery pressure of the hydraulic pump;

a highest load pressure detection circuit that detects a highest load pressure of the actuators and outputs the detected highest load pressure to a highest load pressure line; and a signal pressure relief valve connected to the highest load pressure line via a restrictor and configured to limit the maximum pressure of the highest load pressure introduced to a downstream side of the restrictor, to a pressure lower than a set pressure of the main relief valve;

wherein, the pump control device receives a differential pressure between the delivery pressure of the hydraulic pump and the highest load pressure in the downstream side of the restrictor and the pump control device controls the capacity of the hydraulic pump such that the differential pressure equals the target differential pressure for the load-sensing control, while the differential pressure between the delivery pressure of the hydraulic pump and the highest load pressure in the downstream side of the restrictor is introduced into the plurality of pressure compensating valves as the target compensation differential pressure; and wherein:

the main relief valve is configured such that when a specific actuator of the plurality of actuators is not actuated, the set pressure of the main relief valve is remained at a first value, and when the specific actuator is actuated, the set pressure of the main relief valve increases from the first value to a second value larger than the first value; and the signal pressure relief valve is configured such that when the specific actuator is not actuated and the set pressure of the main relief valve is remained at the first value, the set pressure of the signal pressure relief valve is remained at a third value smaller than the first value of the set pressure of the main relief valve, when the specific actuator is actuated and the set pressure of the main relief valve increases to the second value, the set pressure of the signal pressure relief valve increases from the third value to a fourth value smaller than the second value of the set pressure of the main relief valve, the first to forth values being set such that a difference between the first value of the set pressure of the main relief valve and the third value of the set pressure of the signal pressure relief valve and a difference between the second value of the set pressure of the main relief valve and the fourth value of the set pressure of the signal pressure relief valve are both smaller than the target differential pressure for the load-sensing control.

2. The hydraulic driving system for a construction machine according to claim 1, wherein:

the signal pressure relief valve is configured such that when the set pressure of the signal pressure relief valve increases from the third value to the fourth value, the set pressure increases by the same value as a value by which the set pressure of the main relief valve increases from the first value to the second value.

3. The hydraulic driving system for a construction machine according to claim 1, wherein:

the signal pressure relief valve is configured such that as the target differential pressure for the load-sensing control decreases, the third value and fourth value of the set pressure increase and the differential pressure between the delivery pressure of the hydraulic pump and the highest load pressure in the downstream side of the restrictor decreases.

4. The hydraulic driving system for a construction machine according to claim 1, further comprising:

operating devices that each generate an operating pilot pressure for switching a corresponding one of the flow control valves, wherein:

the main relief valve includes a first pressure receiving element to which an operating pilot pressure generated by the operating device for the specific actuator generates is applied and is configured such that when the operating pilot pressure applied to the first pressure receiving element is lower than a threshold level, the set pressure of the main relief valve is remained at the first value, and when the operating pilot pressure equals or exceeds the threshold level, the set pressure of the main relief valve increases to the second value; and the signal pressure relief valve includes a second pressure receiving element to which an operating pilot pressure generated by the operating device for the specific actuator generates is applied and is configured to such that when the operating pilot pressure applied to the second pressure receiving element is lower than the threshold level, the set pressure of the main relief valve is remained at the third value, and when the operating pilot pressure equals or exceeds the threshold level, the set pressure of the main relief valve increases to the fourth value.

5. The hydraulic driving system for a construction machine according to claim 1, wherein:

the construction machine is a hydraulic excavator; and the specific actuator is a track motor of the hydraulic excavator.

* * * * *